Dec. 15, 1931.  X. SEITZ  1,836,191
HOOD FOR MOTOR CARS AND OTHER VEHICLES
Filed Sept. 11, 1929  2 Sheets-Sheet 1
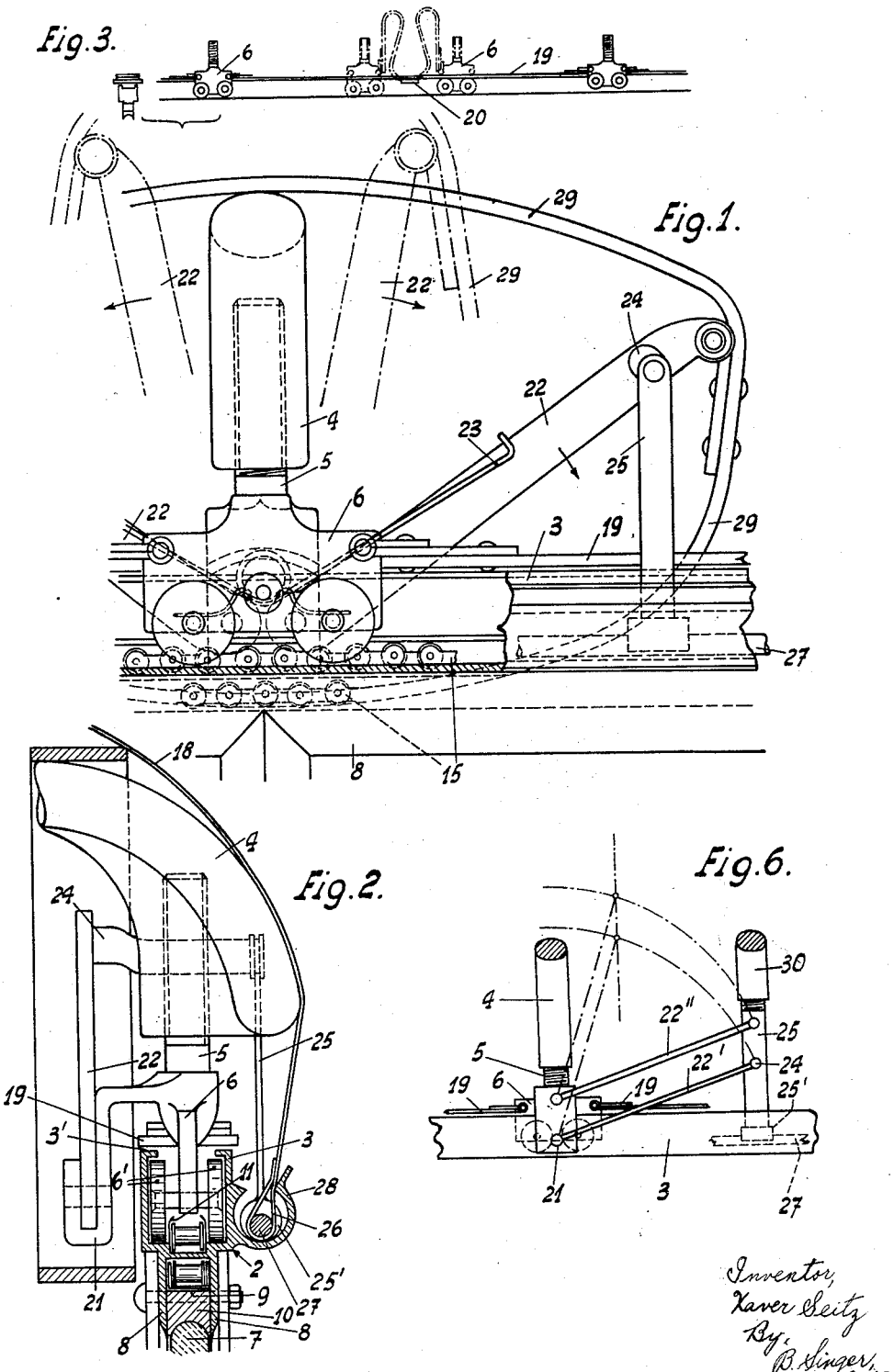

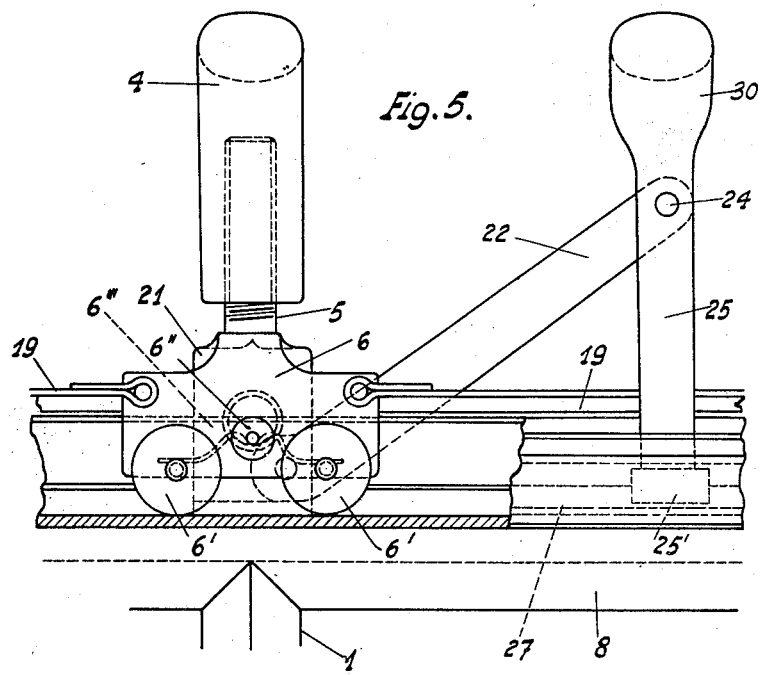
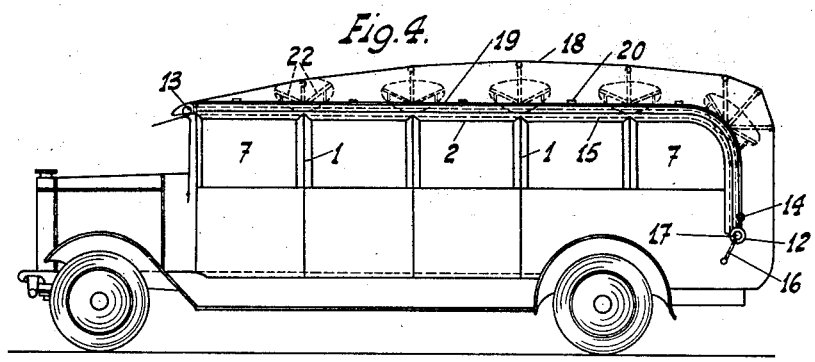
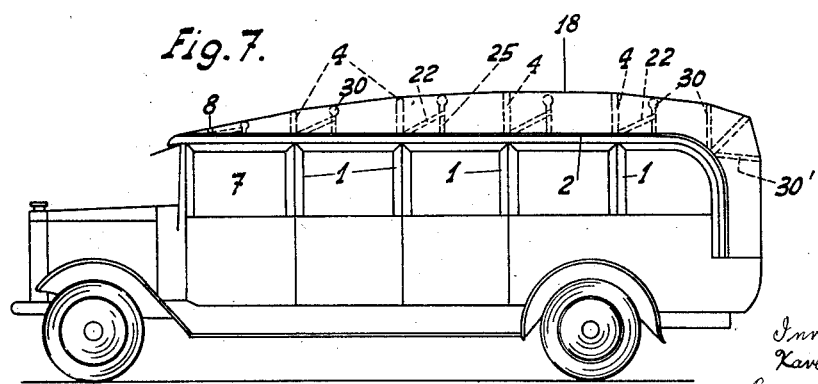

Patented Dec. 15, 1931

1,836,191

UNITED STATES PATENT OFFICE

XAVER SEITZ, OF BADEN, GERMANY

HOOD FOR MOTOR CARS AND OTHER VEHICLES

Application filed September 11, 1929, Serial No. 391,805, and in Germany January 27, 1928.

The invention relates to improvements in and relating to hoods for motor cars and other vehicles and more especially to means to raise the flexible covering of the hood, to fold it and to fasten the edges thereof.

The invention more particularly relates to hoods of the kind in which cant rails are secured to the body of the vehicle and extend from the front to the rear thereof, a plurality of hood sticks for supporting the flexible covering being arranged to engage the cant rails whereby they will be supported.

The main object of the invention is to provide improved means to lay the collapsible covering in folds.

A further object consists in the provision of means to secure a tight joint between the covering and the car body.

A still further object is the provision of means which facilitate the folding of the covering and to keep the folds out of contact with the hoodsticks.

With these and other objects in view the invention consists in the particular construction and arrangement of parts as hereinafter more particularly described and as defined in the annexed claim.

Referring to the accompanying drawings which illustrate the preferred form of the invention.

Fig. 1 shows a part of the device in side elevation, parts being broken away;

Fig. 2 shows the same part as Fig. 1 in a cross-section,

Fig. 3 illustrates in a diagrammatical manner the working of the device;

Fig. 4 is a side view of a motor car provided with the device,

Fig. 5 shows on a larger scale part of a hood stick and its mounting on the cant rail in side elevation parts being shown in section;

Fig. 6 illustrates in a diagrammatical manner the operation of a hood stick with the auxiliary stay pertaining thereto;

Fig. 7 is a side elevation of a motor car provided with the hood.

The body of the motor car is provided along each side with a series of pillars 1 forming guide ways for the sliding windows. The pillars 1 support on each side of the car trusses 2, on which the cant-rails 3 are fixed. The cross section of the cant-rails 3 is substantially U-shaped. In said rails 3 carriages 6, each fitted with two pairs of rollers 6' are mounted running freely in said rails 3. Each carriage 6 supports the lower end of a hood stick 4. The carriage 6 and the hood stick 4 are interconnected by a screw-threaded bolt 5. A second pair of rollers 6" are pressed upwardly by springs 6''' against the inwardly extending flanges 3' of rail 3. The ends of the spring 6''' bear downwardly on the spindles of the rollers 6', the centre portion of said spring pressing upwardly under the axis of the rollers 6". The carriages 6 are positively guided by the said rail 3. On the lower side of the rail 3 are downwardly projecting flanges 8, between which the upper ends of the sliding windows 7 enter. A cushion 10 of india rubber inserted between said flanges 8 ensures a tight joint. Between the flanges 8 a rail 9 and on said rail 3 another rail 11 both of U-shaped cross-section are arranged which rails 9 and 11 form guides of an endless chain 15. The chain 15 runs over guide rollers 13, and 14, and over a chain wheel 12 with crank handle 16 by means of which the chain 15 is moved. One chain wheel 12 is arranged on either side of the car, the wheels 12 are mounted on a common shaft 17 on which said crank handle 16 is removably mounted. The chain 15 moves the carriages 6 in their guide, the fore most carriage 6 is connected to said chain 15, and the carriages 6 are interconnected by a flexible member 19 for instance of leather. Between two consecutive carriages 6 a block 20 is slidably mounted on the said rail 3 (Fig. 3) to which the member 19 is attached. By folding the covering of the hood the members 19 form upright loops, which loops support the covering and prevent it from making contact with the rail 3.

To each carriage 6 a sidewardly projecting support 21 is fixed on which two levers 22 are rotatably mounted. For each lever 22 a spring 23 is arranged fixed with one end to the carriage 6 and abutting with the other on the lever 22 pressing it downwardly. Near the free end of each lever a bolt 24 is arranged projecting horizontally and supporting a carrier 25, which swings freely on said bolt. The lower end of carrier 25 is attached to a rope 27 fastened to the edge 26 of the covering, the rope 27 being clamped between spring jaws 25′ of the lower end of carrier 25 (Fig. 2). Instead of two levers 22 only one lever might be arranged on each carriage 6. The levers 22 acting under the tension of the spring 23 guide the edge 26 of the covering inserting, said edge 26 with rope 27 into a curved flange 28 fixed to said rail 3. The rail 3 prevents access of rain and wind into the interior of the car, and water from the covering is led off by these channels 28.

On the two levers 22 of a carriage a strap 29 of stiff material is fixed forming a closed loop. The ends of said strap might be connected to the carriage 6. Moreover only one strap 29 might be arranged on one side of the car, the ends of the said strap being connected to the first and the last lever 22 on a side of the car. By folding the covering of the hood the levers 22 assume the position shown in broken lines in Fig. 1, the covering therefor is laid in folds of regular shape and holds the covering off the hood sticks, and the levers 22. As the hoodsticks and the levers 22 are of iron the covering if wet would otherwise facilitate the rusting of said iron parts and become soiled by the rust.

In the modification as shown in Figs. 5 to 7 each main hoodstick 4 is provided with an auxiliary hoodstick 30. Each hoodstick 30 is attached to two levers 22 on the same side of the main hoodstick 4 and on two side walls of the car.

By unfolding the covering the levers 22 drop into the position shown in Fig. 5, the rope 27 becomes stretched and taut and the carriers 25 are held in vertical position. The carriers 25 press the edge of the covering into the channel 28 whereby a tight joint is obtained. The auxiliary hoodsticks 30 support the covering 18 at intermediate places between the main hoodsticks 4, the latter might be arranged at comparatively great distances apart.

By folding the covering the chain 15 draws the carriages 6 together and the auxiliary hoodsticks 30 are brought to bear against the main hoodsticks 4. The levers 22 raise said stick 30 slightly over the main hoodsticks 4 and increase thereby the number of the folds of the covering. The folds of the covering are close together; the folded covering needs little space and may be easily arranged at the rear of the carriage.

The hoodstick 4 which is arranged to stand at the rear corner of the hood is provided with two auxiliary hoodsticks 30, 30′ Fig. 7. Such additional auxiliary hoodsticks might be arranged at the fore end of the hood or wherever it might be necessary.

To control and guide the auxiliary hoodstick straight line motions might be used for instance such as shown in Fig. 6. On the main hoodstick 4 two levers 22′ 22″ are pivoted running parallel to each other and linked to an auxiliary hoodstick 30. The hoodstick 30 remains in its vertical position at the folding of the covering reducing thereby the wear of the covering considerably. The auxiliary hoodsticks 30 are raised above the hoodsticks 4 and therefore the covering is neatly and compactly folded.

In place of the carriers 25 attached to the levers 22, 22′, 22″ clamps might be provided on the carriages 6 or on the hoodsticks 4 to hold the edge of the covering in the channel 28.

I wish it clearly understood that I do not confine my invention to the particular construction, as shown and described as various changes may be made without departing from the spirit of the invention.

What I claim and wish to secure by U. S. Letters Patent, is:—

A folding hood for a carriage body, comprising a flexible covering, hoodsticks supporting said cover, carriages on which said hoodsticks are mounted, guide rails for said carriages, a channel on each of said rails to receive the edge of the covering, auxiliary hoodsticks, carriers therefor attached to the edges of the covering and link members connecting said auxiliary hoodsticks to the carriages and arranged for vertical angular movement, so that when the carriages are moved toward the auxiliary hoodsticks the latter are raised, thereby raising the edges of the covering to which they are connected out of said channels, said auxiliary hoodsticks being arranged at points between the carriage supported hoodsticks.

In testimony whereof I affix my signature.

XAVER SEITZ.